United States Patent Office 3,317,375
Patented May 2, 1967

3,317,375
FUNGISTATIC THIOUREA WOOD-BLUEING PREVENTION AND WOOD-PROTECTION COMPOSITIONS WITH POLYETHYLENE-GLYCOL ALKYL THIOETHER
Georges Molinet, Pau, Georges Durand, Mourenx-Ville-Nouvelle, and Jacques Mestreit, Pau, France, assignors to Societe Nationale des Petroles d'Aquitaine, Paris, France
No Drawing. Filed Sept. 8, 1964, Ser. No. 395,052
Claims priority, application France, Sept. 12, 1963, 947,320
3 Claims. (Cl. 167—38.6)

The invention relates to a new fungicidal composition and more especially to a composition which is applicable to the protection of various materials against the invasion thereof by fungi, and particularly moulds.

The problem of combatting moulds and other fungi, which arises in many branches of human activity, has been given various solutions, which use according to circumstances different products, the majority of which are more or less toxic or harmful to human beings and domestic animals. Among the anticryptogamic treatments carried out on a large scale at the present time, there is for example that of wood or timber, which it is important to preserve against the action of lower fungi. It is in fact known that the sap wood of many species particularly of resinous trees and poplars, is rapidly affected, after felling or cutting, by a blueish-black colouring; this "blueing" is due to the invasion of the cells of the sap wood by the filaments of certain of the numerous species of the Ascomycetes fungi belonging to the Ceratocystis genus, also known under the names of Ceratostomella or Ophiostoma.

The present invention provides a considerable progress in the combatting of undesirable fungi, the principle advantages of this progress being the innocuousness with respect to human beings, domestic animals and cultivated plants, and a strong activity, combined with the facility and very substantial economy in the use of the new fungicidal and fungistatic composition. The new composition, while being suitable for application to different objects or materials where it is a question of preserving them against the proliferation of various fungi, is particularly useful for the industry handling cellulose materials and especially the wood or timber industry; actually, because of its outstanding fungistatic properties, this composition permits of keeping intact the logs, planks, trunks or other products originating from the felled tree until these products are subsequently used, this being effected without the slightest danger or inconvenience to the persons using the new composition. The invention thus makes it possible to combat with great ease and efficiency the Ascomycetes referred to above. On the other hand, the new composition has the advantage of being adapted to a very rapid application, this permitting time to be saved by comparison with the known treatments; it is actually absorbed by the cellulose materials much more quickly than the majority of the conventional fungicides.

The new composition according to the invention is formed by thiourea and/or one or more thiourea derivatives to which is added a small proportion of a surface-active agent.

In the remainder of the present description, the term thiourea by itself is generally used for the purpose of simplification, but it is understood that this compound may be partially or completely replaced by its different derivatives, such as organic or inorganic acid salts, thioureas which are alkylated or arylated on the nitrogen atom, etc.

The composition may be presented in the form of a powder, formed by the powder of thiourea intimately mixed with a small quantity of a surface-active agent, which may be used in the solid, liquid or pasty state. When the treatment is effected by dusting the objects or materials to be protected with the composition in powder form, it is frequently expedient for the said composition to contain one of the known loading agents which are usually employed in similar products, for example, colloidal silica, clay, alumina or the like for facilitating the application.

The new composition may advantageously be presented in the form of a more or less concentrated solution, destined to be diluted to the appropriate concentration at the moment of use. It may also be given in advance the concentration provided for a given use. Thus, the solutions according to the invention usually titrate 0.1 to 10% by weight of active substance.

Although the ratio between the thiourea and the surface-active substance may vary within fairly large limits, it is generally between 99.95/0.05 and 95/5, and most frequently between 99/1 and 99.9/0.1. The proportion of the surface-active agent to be used depends to a large extent on the nature of this agent, particularly on its wetting powder; it also depends on the nature of the liquid in which it is desired to dissolve or disperse the powdered composition for the purpose of its application.

In actual practice, different liquids which are solvents of thiourea, as for example alcohols, ketones, ethers, such as dioxane, esters, etc. can be used, although water is of course the most economical liquid.

For the liquid application, the composition may also be brought into the form of a suspension or emulsion. Liquids such as aliphatic or aromatic hydrocarbons, for example mineral oil, petrol, benzene, toluene, oil of terpentine or others, may then serve as vehicles.

The aqueous medium which is particularly favourable for the fungicidal impregnation of various cellulose materials, such as wood, reeds, straw, paper, cotton, jute, etc., is an aqueous solution of thiourea, containing a surface-active agent; it constitutes the preferred form of the composition when such materials have to be protected.

As surface-active agents, it is possible to use all those which greatly reduce the surface tension between the thiourea solution and the material to be treated. It is thus possible to introduce the following into the composition according to the invention: alkali or ammonia salts of sulphonated fatty alcohols or acids; taurine and its salts; alkali naphthenates; biliairy salts; amines of fatty acids, particularly quaternary amine; alkali, ammoni or amine salts of long-chain sulphonated hydrocarbons, such as those known for example commercially under the name of "Teepol"; polyoxyethylene phenols; alkyl-aryl sulphonates, etc.

However, particularly good results are obtained when the surface-active agent is itself a thio compound and especially when it is formed by a mercaptan derivative.

Thus, the preferred form of the invention comprises mixtures of thioureas with polyethylene glycol alkyl mono thioethers. The suitable activity for reducing surface tension is generally obtained when the alkyl of the thioether has a fairly high molecular weight, particularly when it contains more than 6 carbon atoms, the number of oxyethylene units being preferably also greater than 6. Agents in accordance with the preferred form of the invention are particularly those in which the alkyl has 6 to 30 carbon atoms for example octyl, nonyl, decyl, undecyl, lauryl, terdodecyl, stearyl, arachidyl, tetracosanyl, cerotyl and so on, while the polyethylene glycol group contains 6 to 18 —OCH$_2$CH$_2$— units.

The application of the special agents produces a synergetic action with that of the thiourea, substantially increasing the efficiency of this latter. In addition, the presence of a surface-active agent has the effect of improving and accelerating the spreading and the penetration of the composition on and in the material to be protected against the fungi. It is found that in the presence of a surface-active agent, it is sufficient to use a substantially smaller concentration of thiourea in order to obtain the desired fungistatic effect; the surface-active agent thus improves the efficiency of the thiourea. On the other hand, the presence of such an agent in the thiourea powder provides the advantage of greatly reducing the tendency of the powder to form lumps; as a consequence, the compositions in powder form according to the invention show a better behaviour during storage and can be more easily handled.

As mentioned above, the thiourea may be accompanied or replaced in the new compositions by its different derivatives, such as for example: methyl-, dimethyl-, ethyl-, diethyl-, propyl-, tripropyl-, phenyl-, diphenyl-, and benzyl-thioureas; the sulphate, nitrate, phosphate, sulphite, perchlorate, hydrochloride, formate, acetate, propionate, oxalate, tartrate and the like of thiourea or of an alkyl or aryl urea. These compounds are mentioned simply as non-restrictive examples, and it is understood that there are other substituted or combined thioureas which can be used.

In order to illustrate the invention, several non-limitative examples are hereinafter described to show how it is carried into effect.

*Example 1*

Tests in connection with the fungistatic action on four different fungi were carried out in vitro with a composition formed by 99.2 parts by weight of thiourea and 0.8% of polyethylene glycol terdodecyl monothioether having 11 oxyethylene units per molecule.

The conventional procedure by incorporation was used, that is to say, increasing dilution of the active substance in a nutrient medium.

Two series of tests were respectively carried out in tubes containing a liquid medium and in Petri dishes on solid medium containing gelose. At least 3 tubes and 3 dishes were employed for each of the concentrations to be studied.

The tubes and Petri dishes were seeded in sterile manner with a germ, namely a fragment of mycelium or spores of the fungus being studied. The cultures were left in an oven at 24° C. in a relative humidity of 97% for 6 days, after which the contents of the tubes and dishes were examined.

It was then established that the following results were the same for the tubes and for the Petri dishes, that is to say, in liquid and solid medium.

| Fungus | Concentration of active substance— | | | |
|---|---|---|---|---|
| | 0 | 0.1% | 0.05% | 0.01% |
| Penicillium funiculosum | + + | + | + | + |
| Penicillium cyclopium | + + | 0 | + + | + + |
| Fusarium bulbigenum | + + | 0 | + + | + + |
| Alternaria perii | + + | 0 | + | + |

+ + designates a strong proliferation and + a small proliferation of the seeded fungus, while 0 signifies the complete absence of the fungus.

It is seen that the composition investigated had a complete fungistatic action in the concentration of 0.1%, except in respect of the *Penicillium funiculosum*, which seems to be more resistant.

*Example 2*

The technique of Example 1 was applied with the same fungicidal composition in concentrations of 0.1 to 0.3% to *Penicillium funiculosum*.

The cultures obtained, after incubation for 6 days, were presented as follows:

0% of active substance (comparison test)—Strong proliferation
0.1% of active substance (comparison test)—Weak proliferation
0.15% of active substance (comparison test)—No proliferation
0.2% of active substance (comparison test)—No proliferation
0.3% of active substance (comparison test)—No proliferation It is apparent from the foregoing that a concentration of 0.15% of thiourea and 0.0012% of polyethylene glycol terdodecyl monothioether having 11 oxyethylene units is sufficient to prevent all growth of *Penicillium funiculosum*. In similar tests using thiourea solution without surface-active agent, a concentration of 0.3 must be reached to completely prevent the growth of the Penicillium.

*Example 3*

Test elements consisting of sap wood of Scotch pine with the dimensions of 30 x 10 x 5 mm. were immersed for 20 minutes in an aqueous solution of the fungicidal composition according to Example 1. After drying for 1 month in the open air, they were rewetted; they were then brought into contact with pure cultures of a fungus isolated from a Douglas fir, on which this fungus has caused an intense blueing. After a period of attack of 2 months by the cultures, the specimens were removed from the cultures and examined.

There were 3 series of test elements:

(1) The comparison specimens which had been immersed in water not containing fungicidal composition;
(2) Test elements which had been immersed in a 3% solution of fungicidal composition;
(3) Those of which the treatment solution contained 5% of the composition.

In the three cases, the wood has absorbed about 21% of its weight of water during the immersion. The test elements treated with the composition had retained the following quantities of the composition:

|   | Kg. per cubic metre of wood |
|---|---|
| 2 | 6.4 |
| 3 | 10.3 |

Whereas after the withdrawal of the comparison test elements (1) from the cultures, the said elements were strongly blue in colour and contained numerous mycelium filaments inside the wood, the test elements (2) and (3) did not show any blueing, their colour had not changed and, if a few filaments were attached to their surfaces, none had penetrated into the wood. Similar tests were carried out with solutions having 3% to 5% of thiourea sole, without any surface-active agent; in this case, the test elements treated with the 3% solution showed a noticeable blueing, and only the 5% solution had made it possible to obtain the same result as that found under 2 above.

*Example 4*

On batches of 14 to 50 pine planks, there was carried out the treatment which consisted in plunging the planks for 10 seconds into a semicylindrical tank provided with a revolving device for ensuring the circulation of the planks, the said tank containing a 5% aqueous solution of the fungicidal composition indicated in Example 1.

The planks were then stacked crosswise and left in the open, in a fairly humid region at the edge of the forest. Comparison planks which were untreated and of the same dimensions were also stacked in the same region. After respectively 42 and 68 days, between May and July, the percentage of planks showing blue stains on the surface and in the interior was established; this latter observation applied to the fresh cut after dividing each plank, that is to say, after sawing it into two planks of a thickness half that of the initial plank.

The results obtained are set out in the following table.

|  | Percent of planks showing blue stains | | | |
|---|---|---|---|---|
|  | Untreated planks | | Treated planks | |
|  | Surface | Interior | Surface | Interior |
| After 68 days: | | | | |
| Thickness, 25 mm | 100 | 100 | 28.5 | 9.5 |
| Thickness, 40 mm | | | 0 | 0 |
| After 42 days: | | | | |
| Thickness, 25 mm | 100 | 100 | 0 | 0 |

*Example 5*

Tests similar to those of Example 4 were carried out with a 3% solution of the same fungicidal composition. Examination carried out after 30 days did not show the existence of any blue-stained plank, while all the comparison specimens which had not been treated had already suffered from the blueing.

We claim:

1. Process for preventing the blueing of wood, which consists in soaking sound pieces of wood in an aqueous solution containing 2 to 5% of a composition formed of 99 to 99.9 parts by weight of thiourea and 1 to 0.1 part of a polyethyleneglycol alkyl monothioether the alkyl group of which has 6 to 30 carbon atoms per molecule, and the molecule contains 6 to 18 oxyethylene units.

2. Process for preventing the blueing of wood, which consists in soaking sound pieces of wood in an aqueous solution containing 2 to 5% of a composition formed of 99 to 99.9 parts by weight of thiourea and 1 to 0.1 part of polyethyleneglycol terdodecyl monothioether the molecule of which contains 11 oxyethylene units.

3. Composition for the fungistatic protection of wood liable to be attacked by moulds, which is constituted by a powder formed by the intimate mix of 95% to 99.95% by weight of thiourea with 5% to 0.05% by weight of a polyethyleneglycol alkyl monothioether the alkyl group of which has 6 to 30 carbon atoms per molecule, and the molecule contains 6 to 18 oxyethylene units.

References Cited by the Examiner

UNITED STATES PATENTS

| 2,205,021 | 6/1940 | Schuette et al. | 260—457 |
| 2,298,017 | 10/1942 | Loughborough | 144—309 |
| 2,374,544 | 4/1945 | Hoyt | 252—152 |
| 2,582,868 | 1/1952 | Hausmann et al. | 99—103 |
| 2,601,329 | 6/1952 | Sanders et al. | 252—152 |
| 3,047,357 | 7/1962 | Gobert | 21—7 |

OTHER REFERENCES

Chemical Abstracts 39:995(6)(1945).
Chemical Abstracts 40:1243(6)(1946).
Chemical Abstracts 42:1671e; 8253bc(1948).
Chemical Abstracts 43:3880bd(1949).
Chemical Abstracts 46:7146d(1952).
Chemical Abstracts 53:20246b(1959).
Chemical Abstracts 57:10081c(1962).
Chemical Abstracts 58:6134b(1963).

ELBERT L. ROBERTS, *Primary Examiner.*

LEWIS GOTTS, *Examiner.*

SHEP K. ROSE, *Assistant Examiner.*